Aug. 19, 1947. J. M. BAER 2,425,714
QUICK FREEZING OF FOODS
Filed Oct. 12, 1944
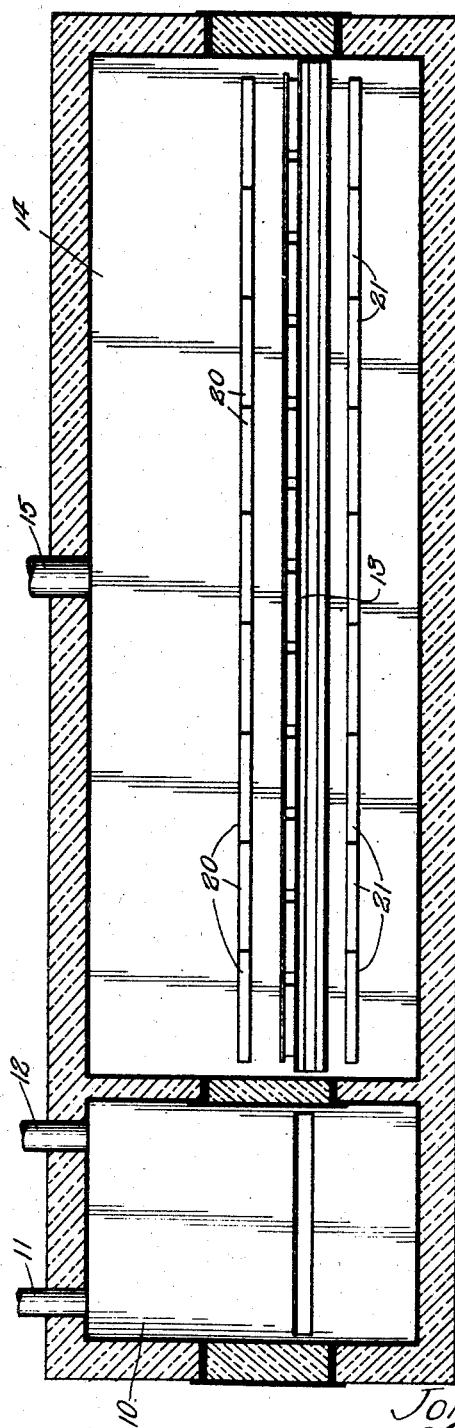
Inventor:
John M. Baer,
By Churton, Wiley Schroeder,
Merriam, & Hofgren, Attys.

Patented Aug. 19, 1947

2,425,714

UNITED STATES PATENT OFFICE 2,425,714

QUICK FREEZING OF FOODS

John M. Baer, Chicago, Ill., assignor to The Guardite Corporation, a corporation of Illinois Application October 12, 1944, Serial No. 558,400

3 Claims. (Cl. 99—192)

This invention relates to the quick freezing of foods and more particularly to the quick freezing of foods by radiant cooling.

For some time quick freezing of foods has been carried out on a relatively large scale. The general procedure is to employ contact cooling in which the object to be frozen is, sometimes after blanching, brought into contact with a cold surface. Such a method is not thoroughly satisfactory. In the first place there is a tendency for aqueous portions of the products to freeze and cake on the cold surfaces and interfere with cooling. The removal of such caked ice interferes with the continuity of the process.

On the other hand, some efforts have been made to freeze materials by evaporation of moisture therefrom. Such processes can be worked where the amount of material involved is very minute, but the enormous volumes of water required to be handled make such a process unworkable on a large scale for bulk materials.

In the present process the food product is treated preferably in finely divided form. The process is applicable to fruits, vegetables, meats, fish, and other products, whether in solid or syrup form.

The fresh material is first blanched in any suitable fashion. Preferably blanching is carried out in a vacuum in the absence or substantial absence of air. In this blanching, the product, after removal of air and substitution of an atmosphere of steam at very low pressure, is subjected to steam at increasing temperature and pressure until it has reached a blanching temperature which is ordinarily over 165° F. The blanching temperature may, however, be considerably higher than this, as, for example, as high as 230° F. on some products such as certain meats. The blanching operation continues at this temperature for a short time. Usually from 2 to 10 minutes is sufficient to accomplish blanching. Thereafter the product is cooled by evacuation of moisture until the product has reached a temperature only slightly above its freezing point. For most products a temperature of about 35° F. is satisfactory. In some instances where the freezing point is markedly less than 32° F., a corresponding reduction in the minimum temperature should be accomplished.

The cool product, preferably without contact with air, is then subjected to radiant cooling. Radiant cooling is accomplished in an atmosphere preferably of high vacuum and in the absence, so far as possible, of gases that interfere with radiation, such as $CO_2$. Evacuation is also preferably continued during the cooling to remove any water which may be generated. Cooling is accomplished primarily by radiation of the heat of the product to cooling plates or walls adjacent the product. These walls are maintained at a temperature markedly below the temperature of the product, for example, as low as —260° F.

The pre-evacuation and precooling after the blanching step remove superficial water from the product to such a degree as to avoid caking of ice upon the plates during cooling, and caking may be further avoided by maintaining a pressure in the chamber below or substantially at the vapor pressure of water at the temperature of the cooling plates.

The process is preferably progressive and continuous, the food being passed on a conveying system through a chamber adjacent to cooled walls. The walls may of course be progressively cooler as the product proceeds through the chamber.

The invention is illustrated diagrammatically in the drawings, in which 10 represents a blanching chamber having a steam inlet 11 and a vacuum line 12 leading to any suitable evacuating means. From the blanching chamber 10 the product is passed in any suitable way to the conveyor 13 in the radiant cooling chamber 14. This chamber likewise has a vacuum line 15. Above the product is a series of cooling walls or plates 20 which are provided with a cooling medium in any suitable manner. The plates may be made progressively cooler if desired. Where the product is solid and maintained on a screen, the cooling plates may also be positioned below the product as indicated at 21. The product is removed from the chamber in any suitable way.

The invention may also be used for the treatment of non-food products where it is desired to freeze the material, provided the material originally contains a substantial quantity of water.

The radiant walls 20 and 21 of the chamber should be as dark in color as possible, and preferably black. For this purpose a lamp black coating may be desirable.

The foregoing detailed description has been given for clearness of understanding only, and no unnecessary limitations should be understood therefrom.

What I claim as new, and desire to secure by Letters Patent, is:

1. In a method of freezing a moisture-containing food product which comprises blanching the product by removing air therefrom and substituting an atmosphere of steam at a temperature in excess of 165° F., and evacuating the food product to reduce its temperature to a point just above the freezing point of water in the product, the step which comprises passing the product, in outspread form and out of contact with a refrigerating surface, through a chamber having black walls cooled to a temperature of approximately —200° F. wherein the heat of the product is radiated in substantial quantities to the walls and the product is quick-frozen in the chamber, the entire method being conducted in the substantial absence of air and the freezing chamber being continuously evacuated at a pressure below the vapor pressure of water at the temperature of the cooling walls.

2. In a method of freezing a moisture-containing food product which comprises blanching the product at a temperature in excess of 165° F. by removing air therefrom and substituting an atmosphere of steam and evacuating the product to reduce its temperature to a point just above the freezing point of water in the product, the step which comprises passing the material in outspread form and out of contact with a refrigerating surface through a highly evacuated chamber having black walls adjacent the product, said walls being cooled to a temperature of approximately minus 200° F. wherein the heat of the material is radiated in substantial quantities to the walls and the product is quick-frozen in the chamber, the entire method being conducted in the substantial absence of air.

3. In a method of freezing a moisture-containing food product which comprises blanching the product at a temperature substantially above atmospheric by removing air therefrom and substituting an atmosphere of steam and evacuating the product to reduce its temperature to a point just above the freezing point of water in the product, the step which comprises passing the material in outspread form and out of contact with a refrigerating surface through a cooling chamber having walls adjacent the product cooled to a markedly lower temperature than the product, wherein the heat of the material is radiated in substantial quantities to the walls and the product is quick-frozen in the chamber, the entire method being conducted in the substantial absence of air and said cooling chamber being continuously maintained during the freezing operation at a pressure below the vapor pressure of water at the temperature of the walls.

JOHN M. BAER.

REFERENCES CITED

The following references are of record in the file of this patent:

UNITED STATES PATENTS

| Number | Name | Date |
|---|---|---|
| 1,884,429 | Warner | Oct. 25, 1932 |
| 1,955,484 | Birdseye | Apr. 17, 1934 |
| 2,109,002 | Warren | Feb. 22, 1938 |
| 2,116,813 | Weisser et al. | May 10, 1938 |
| 2,345,204 | Logwig | Mar. 28, 1944 |

FOREIGN PATENTS

| Number | Country | Date |
|---|---|---|
| 13,008 | Great Britain | 1895 |
| 489,939 | Great Britain | 1938 |
| 368,013 | Great Britain | 1932 |